United States Patent [19]

Jewell, Jr.

[11] Patent Number: 4,607,544

[45] Date of Patent: Aug. 26, 1986

[54] TOOL FOR CUTTING, STRIPPING AND CONNECTING ELECTRIC WIRE

[76] Inventor: Robert M. Jewell, Jr., 3221 S. Fillmore, Denver, Colo. 80210

[21] Appl. No.: 730,548

[22] Filed: May 6, 1985

[51] Int. Cl.⁴ ............................................. H02G 1/12
[52] U.S. Cl. .......................................... 81/9.4; 7/107; 7/132; 30/90.1; 81/420; 140/121; 156/584
[58] Field of Search ............. 30/90.1; 81/9.4, 420, 81/9.44; 156/49, 51, 584; 29/749, 750; 174/87; 7/107, 132; 140/121

[56] References Cited

U.S. PATENT DOCUMENTS

| | | | |
|---|---|---|---|
| 438,848 | 10/1890 | Keyes | 81/420 |
| 777,412 | 12/1904 | Hamel et al. | 81/9.4 X |
| 941,192 | 11/1909 | Goodridge | 30/90.1 |
| 1,354,365 | 9/1920 | Aaron | 30/90.1 X |
| 1,388,398 | 8/1921 | Adams | 30/90.1 X |
| 3,710,406 | 1/1973 | Stanford | 30/90.1 X |
| 3,821,464 | 6/1974 | Connan | 174/87 |

Primary Examiner—Robert A. Dawson
Attorney, Agent, or Firm—Klaas & Law

[57] ABSTRACT

A tool for cutting electrical wire and stripping a length of electrical insulating material away from the electrically conducting core is provided with an enlarged head on each jaw so that a plurality of exposed electrically conducting cores may be grasped between the heads and twisted around a longitudinally extending axis.

4 Claims, 6 Drawing Figures

U.S. Patent   Aug. 26, 1986   4,607,544
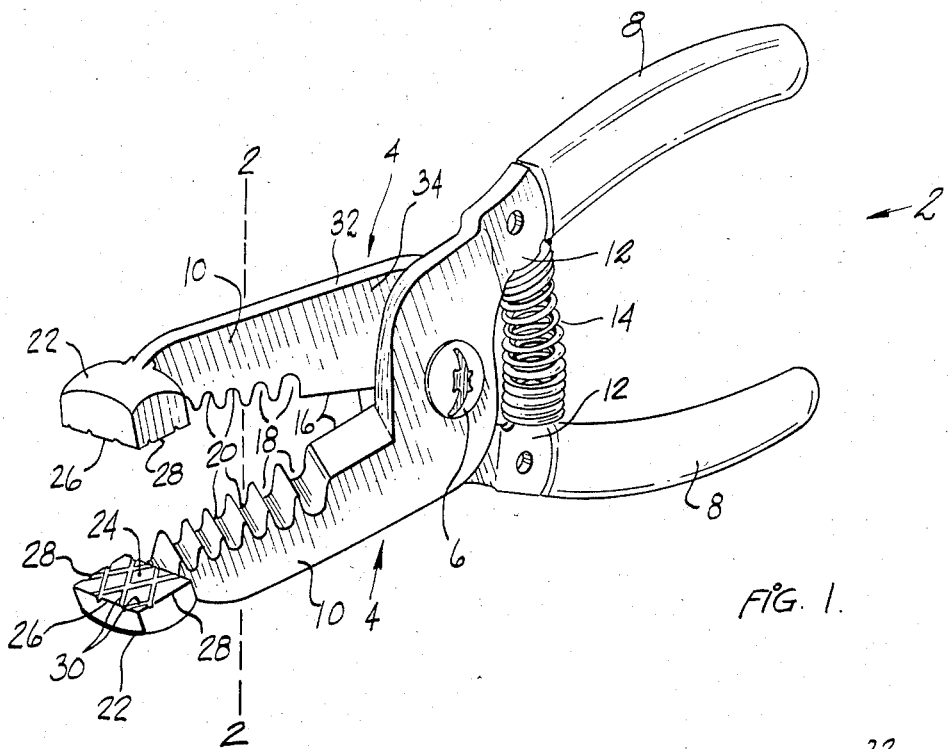
FIG. 1.
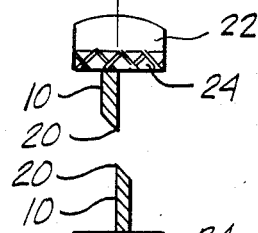
FIG. 2.
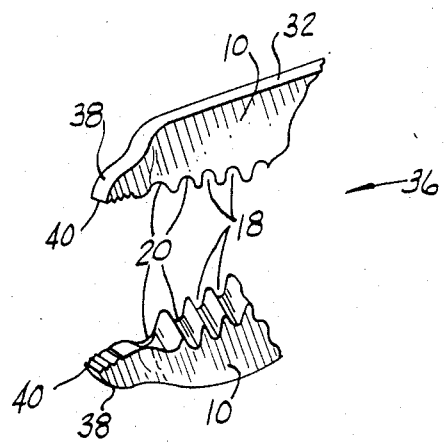
FIG. 3.
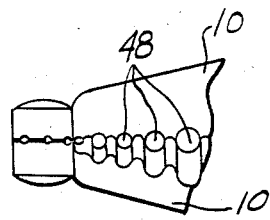
FIG. 4.
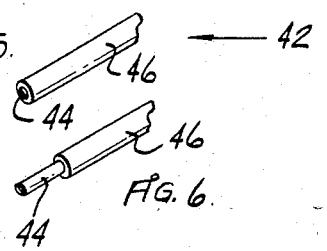
FIG. 5.
FIG. 6.

TOOL FOR CUTTING, STRIPPING AND CONNECTING ELECTRIC WIRE

FIELD OF THE INVENTION

This invention relates generally to a method and apparatus for connecting electric wire and more particularly to a tool for cutting, stripping and twisting of electric wire to be encased in a junction box and a method for using such tool.

BACKGROUND OF THE INVENTION

For many years, it has been a common practice when forming an electrical connection between electric wires to use a tool to grip the end of each electric wire and pull it to a desired position. The end of each electric wire is then cut at a desired location and a length of the electrical insulating material surrounding the electrically conducting core is stripped away. In many instances, the exposed portions of adjacent electrically conduction cores are then inserted into an electrical screw connector which functioned to join the adjacent electrically conducting cores together and to provide electrical insulation around the exposed electrically conducting cores. In a more preferred method, the adjacent electrically conducting cores are twisted about a longitudinally extending axis prior to being inserted into and joined to the screw connector. When using this preferred method, the electrician must change tools, since the tools presently on the market for cutting and stripping the electric wire can not be readily used to grasp the ends of a plurality of adjacent electrically conducting cores and twist them around a longitudinally extending axis.

SUMMARY OF THE INVENTION

This invention provides a method and apparatus, hereinafter referred to as a tool, for use with electric wire having an electrically conducting core surrounded by electrical insulating material which includes cutting the ends of a plurality of electrical wires at a desired location, stripping the electrical insulating material from a length of each of the electrical wires adjacent to the end thereof so as to expose a length of each electrically conducting core. A plurality of exposed electrically conducting cores are positioned adjacent to each other and grasped by the ends of the tool and twisted around a longitudinally extending axis. The tool is removed and the twisted electrically conducting cores are secured within an electrical screw connector.

In a preferred embodiment of the invention, the tool comprises two members which are pivotally connected together by pivot means so as to form two handles on one side of the pivot means and two jaws on the other side of the pivot means. The facing portions of the jaws are provided with cooperating means for cutting electrical wire and stripping the electrical insulating material away from a length of the electric wire to expose a length of the electrically conducting core. The tool is further provided with cooperating means on the facing portions of the jaws so that when a plurality of exposed electrically conducting cores are placed in adjacent relationship, they may be grasped by the cooperating means on the tool and twisted around a longitudinally extending axis. In the preferred embodiment of the invention, the members of the tool are symmetrical about a longitudinally extending axis, which axis if extended would substantially coincide with the longitudinally extending axis about which the exposed electrically conducting cores are twisted.

It is an object of the invention to provide a method and a tool for use with electric wire having an electrically conducting core surrounded by electrical insulating material so that an operator can cut a plurality of electric wires, strip away a length of the electrical insulating material from each electrical wire to expose a plurality of electrically conducting cores, place these electrically conducting cores in adjacent relationship and twist these exposed electrically conducting cores around a longitudinally extending axis using only one tool.

Additional objects, advantages and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a pictorial view of a preferred tool of this invention;

FIG. 2 is a front view of FIG. 1 broken away along line 2—2;

FIG. 3 is a pictorial view of a portion of a prior art tool;

FIG. 4 is a side elevation of a portion of the tool of FIG. 1 in closed position;

FIG. 5 is a pictorial view of an electric wire; and

FIG. 6 is a pictorial view of an electrical wire having an exposed length of the electrically conducting core.

DETAILED DESCRIPTION OF THE INVENTION

In FIG. 1, there is illustrated a preferred embodiment of a tool 2 of this invention. The tool 2 comprises two members 4. Since the members 4 are exact duplicates, the same reference numbers will be used to identify corresponding parts of the members 4. The members 4 are pivotally connected together by pivot means 6 so as to provide opposed handles 8 on one side of the pivot means 6 and opposed jaws 10 on the other side of the pivot means 6. Each of the facing surfaces of the handles 8 is provided with a projection 12 and a spring 14 is mounted on the projections 12 and normally urges the handles 8 and therefore the jaws 10 in a direction away from each other.

Each of the facing portions of the jaws 10 is provided with a cutting edge 16 so as to provide opposed cutting edges for the cutting of electric wire as described below. Each of the facing portions of the jaws 10 is also provided with a plurality of stripping recesses 18 each having a cutting edge 20 so as to provide cooperating means to strip electrical insulating material from an electrically conducting core as described below.

Adjacent to the extremity of each jaw 10, there is provided a gripping head 22 each of which is provided with a generally rectangularly shaped surface 24 having long sides 26 and short sides 28. The surface 24 is provided with intersecting grooves 30 to increase its gripping efficiency. As illustrated in FIG. 1, the long side 26 of the gripping head 22 extends for a distance many times greater than the extend of the surface 32 of each jaw 10 in the same parallel direction. In the preferred embodiment of the invention as illustrated in FIG. 2, a plane passing through the center of the gripping head 22 would lie in the same plane as the plane between the surface 34 of the jaws 10. The surface 24 can have other geometrical configurations so long as there is provided a larger surface area for the purposes described below. Also, the relationship between the location of the gripping head to the other portions of the jaws may be varied.

A portion of a tool 36 used in the prior art to cut electric wire and strip away the electrical insulating material from the electrically conducting core is illustrated in FIG. 3. The tool 36 has jaws 10, cutting edge 16 (not shown) and stripping recesses 18 and cutting edges 20 similar to the tool 2 illustrated in FIG. 1. However, there is a significant difference in the gripping head 38 of the tool 36 as compared to the gripping head 22. As illustrated in FIG. 3, the extent of the leading edge 40 of the gripping head 38 is only for the same distance as the extent of the surface 32 of each jaw 10. In view of this, it is virtually impossible for a operator to grasp a plurality of exposed electrically conducting cores in adjacent relationship and twist such cores around a longitudinally extending axis.

In operation, an electrical wire 42, FIG. 5, having an electrically conducting core 44 surrounded by electrical insulating material 46 is cut by placing the electric wire 42 between the opposed cutting edges 16 and compressing the handles 8 toward each other. The electric wire is then placed in an appropriate recess 18 so that the electrical insulating material 46 may be stripped from the electrically conducting core 44. As illustrated in FIG. 4, when the jaws 10 are in a closed position, the recesses 18 cooperate to form circular openings 48 which correspond to the diameter of the electrically conducting core 44. Thus, when the jaws 10 are moved to a closed position, only the electrical insulating material 46 will be cut by the edges 20. The cut length of electrical insulating material 46 will then be stripped way leaving an exposed length of an electrically conducting core 44 as illustrated in FIG. 6. Two or more electric wires 42 with exposed electrically conducting cores 44 are then placed adjacent to each other and the electrically conducting cores 44 are placed on one surface 24. The handles 8 are squeezed to move the jaws 10 toward each other so that the exposed electrically conducting cores 44 may be grasped. While maintaining pressure on the handles 8 the tool 2 is rotated so as to twist the electrically conducting cores 44 around a longitudinally extending axis. After the electrically conducting cores have been twisted the desired number of turns, the tool is removed and a screw electrical connector is applied to the twisted electrically conducting cores.

As stated above, the members 4 are identical so that when they are joined by the pivot means 6, the tool 2 is symmetrical about a longitudinally extending axis. Therefore, when the plurality of electrically conducting cores 44 are placed on the surface 24, they are positioned so that the longitudinal axis of each electrically conducting core 44 extends in a directional parallel to the longitudinally extending axis of the tool 2. In view of this, the longitudinally extending axis around which the plurality of electrically conducting cores 44 are twisted is also parallel to the longitudinally extending axis of the tool 2. In fact, if the electric wires are properly positioned, the extension of the longitudinally extending axis of the tool 2 will coincide with the longitudinally extending axis around which the electrically conducting cores 44 are twisted.

It is contemplated that the inventive concepts herein described may be variously otherwise embodied and it is intended that the appended claims be construed to include alternative embodiments of the invention except insofar as limited by the prior art.

What is claimed is:

1. A tool capable of use in the cutting, stripping and twisting of electric wire having an electrically conducting core surrounded by electrical insulating material comprising:

at least two members;

pivot means for pivotally joining said at least two members together so as to form two handles on one side of said pivot means and two extensions on the other side of said pivot means so that said at least two members can be moved to an opened or a closed relationship;

each of said extensions terminating in a jaw;

each of said jaws having a gripping surface facing each other;

an elongated portion on each of said extensions located between each of said jaws and said pivot means;

each of said elongated portions having a length, a width and a thickness wherein said length is greater than said width and said with is greater than said thickness;

each of said elongated portions having a planar surface extending in a widthwise direction so that said planar surfaces are in parallel relationship;

a linear cutting edge on each of said planar surfaces;

a plurality of semicircular cutting edges of different diameters spaced apart in a lengthwise direction in each of said planar surfaces so as to form a plurality of circular cutting edges of different diameters when said at least two members are moved toward a closed relationship;

each of said jaws having a length, a width and a thickness in directions corresponding to said length, said width and said thickness of each of said elongated portions; and said thickness of each of said jaws being substantially greater than said thickness of each of said elongated portions so that the ends of at least two stripped electric wires may be readily grasped and twisted with the longitudinal axis of the tool parallel to the longitudinal axes of said at least two stripped electric wires.

2. A tool as in claim 1 wherein:

each of said members is symmetrical about a longitudinal axis.

3. A tool as in claim 2 wherein:

said thickness of each of said jaws is at least twice the thickness of each of said elongated portions.

4. A tool as in claim 3 wherein:

each of said gripping surfaces has an area greater than 1.0 square centimeters.

* * * * *